United States Patent

[11] 3,568,816

| [72] | Inventors | Warren S. Smith;<br>Adil A. Mughannam, San Jose, Calif. |
|---|---|---|
| [21] | Appl. No. | 785,174 |
| [22] | Filed | Dec. 19, 1968 |
| [45] | Patented | Mar. 9, 1971 |
| [73] | Assignee | FMC Corporation<br>San Jose, Calif. |

[54] MULTIPLE FEED AND DISCHARGE SYSTEM AND METHOD
8 Claims, 5 Drawing Figs.

[52] U.S. Cl. .................................................. 198/24,
198/68, 198/179
[51] Int. Cl. .....................................................B65g 17/46,
B65g 47/82
[50] Field of Search........................................... 198/24, 27,
179, 185, 189, 31 (A)3; 193/39

[56] References Cited
UNITED STATES PATENTS
| 1,913,947 | 6/1933 | Otto .............................. | 198/24 |
| 2,066,869 | 1/1937 | Wild.............................. | 193/39 |
| 3,072,239 | 1/1963 | Jones et al. ................... | 198/24 |

Primary Examiner—Robert G. Sheridan
Attorneys—F. W. Anderson and C. E. Tripp

ABSTRACT: Mechanism for feeding at least two distinguishable groups of filled containers into the carriers of a processing conveyor by transferring rows of one of the group of containers into spaced ones of the carriers at one feed station and feeding containers of a distinguishable group of containers into other ones of the carriers at a second feed station that is remote from the first feed station. After processing the containers, all of the rows of containers are discharged from the carriers at a single discharge station and are thereafter segregated into their original groups. The processing conveyor has I-beam carriers thereon and is trained around pairs of small diameter sprockets at each feed station and at the discharge station so as to open the I-beam carriers sufficiently to accommodate a large size range of containers.

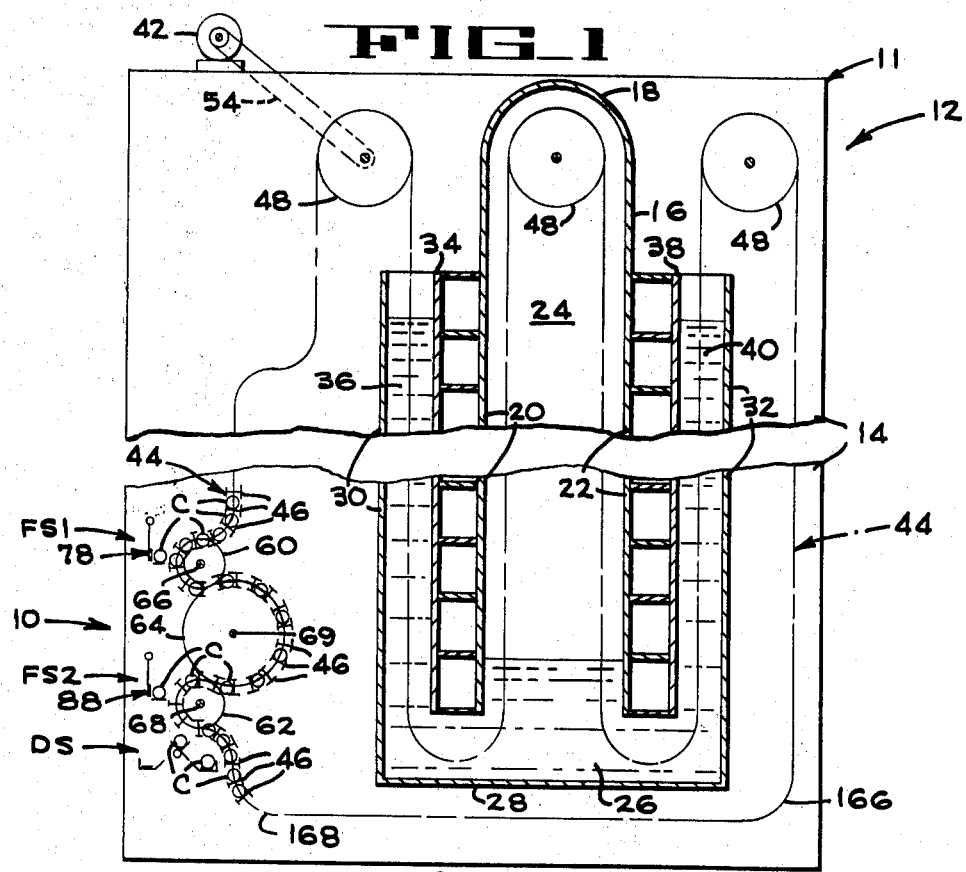
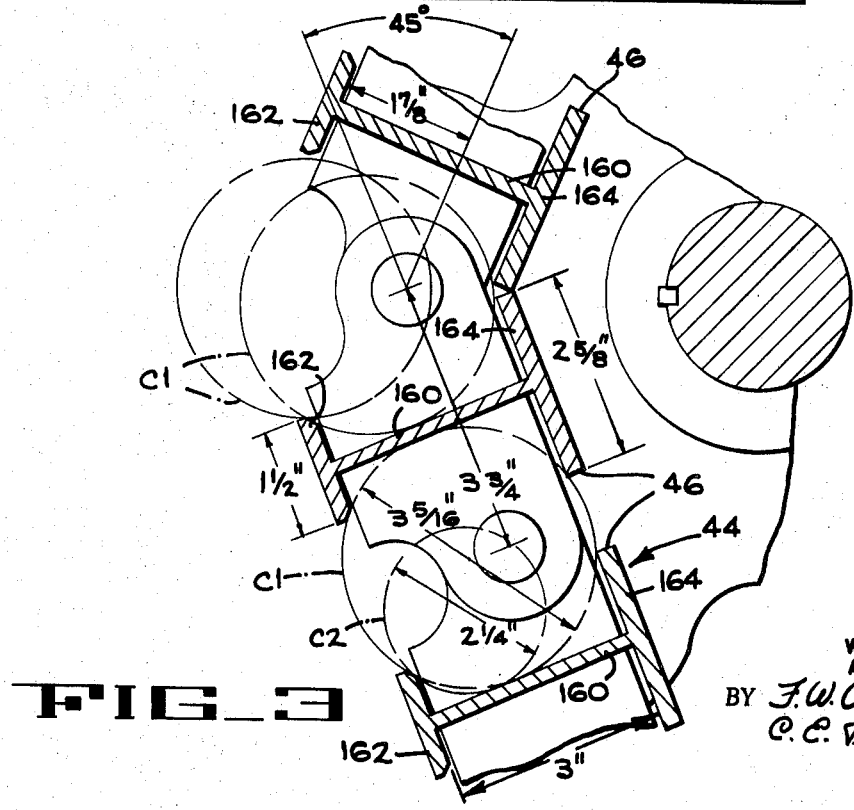

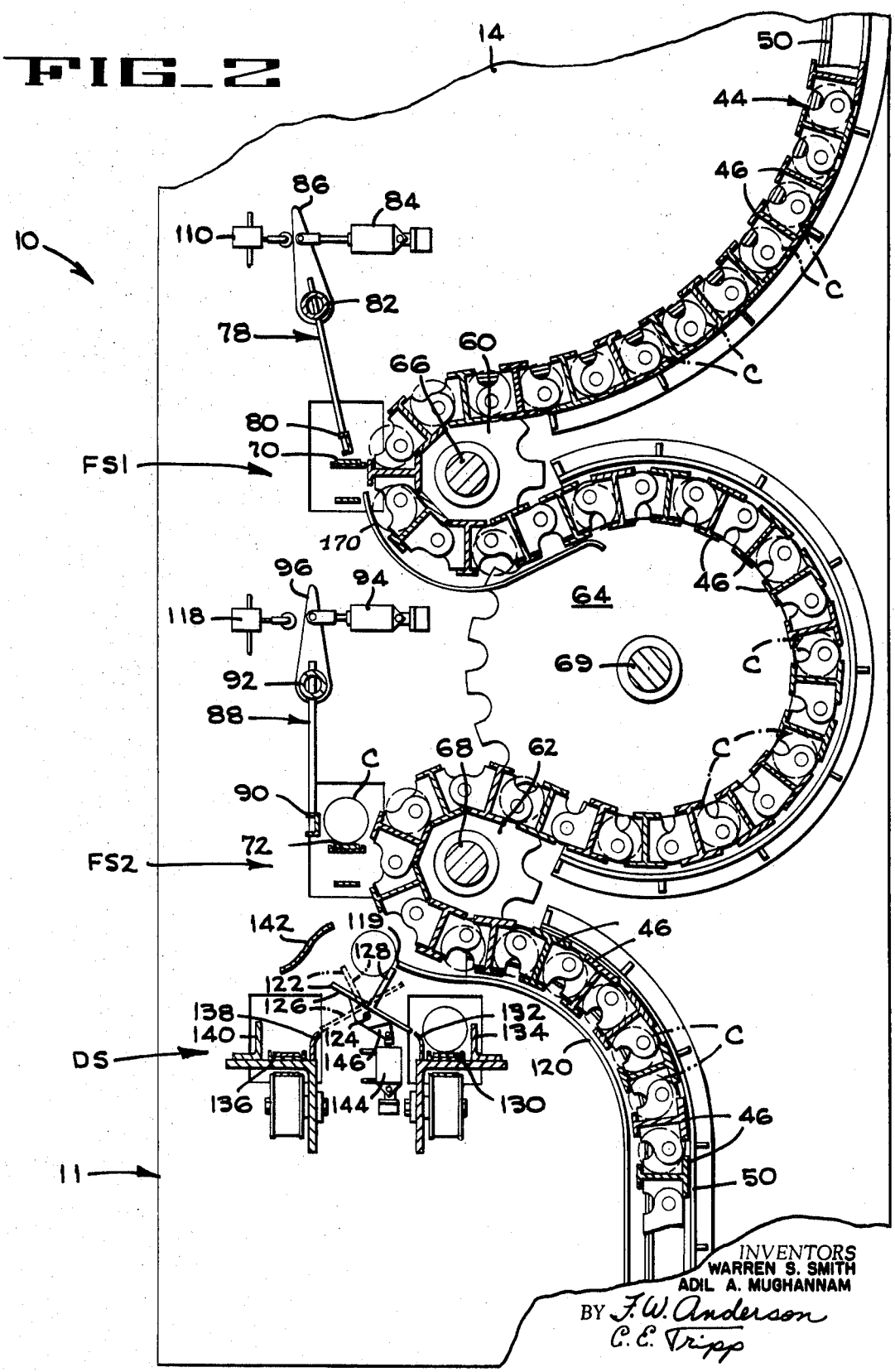

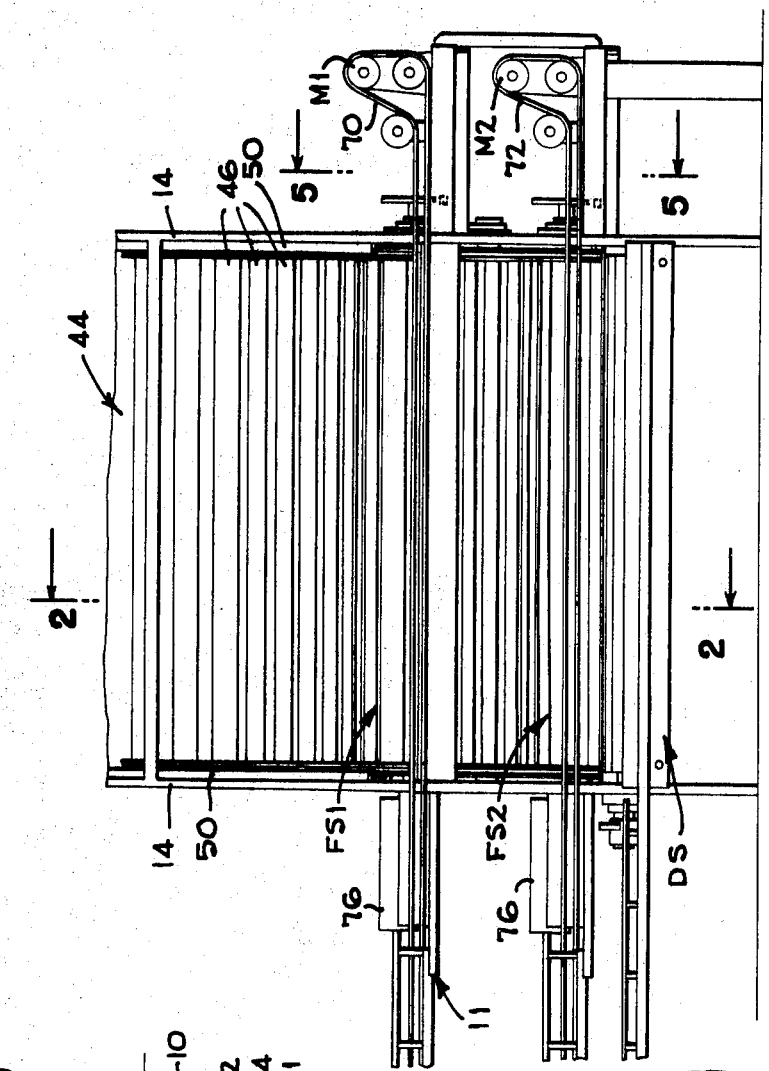
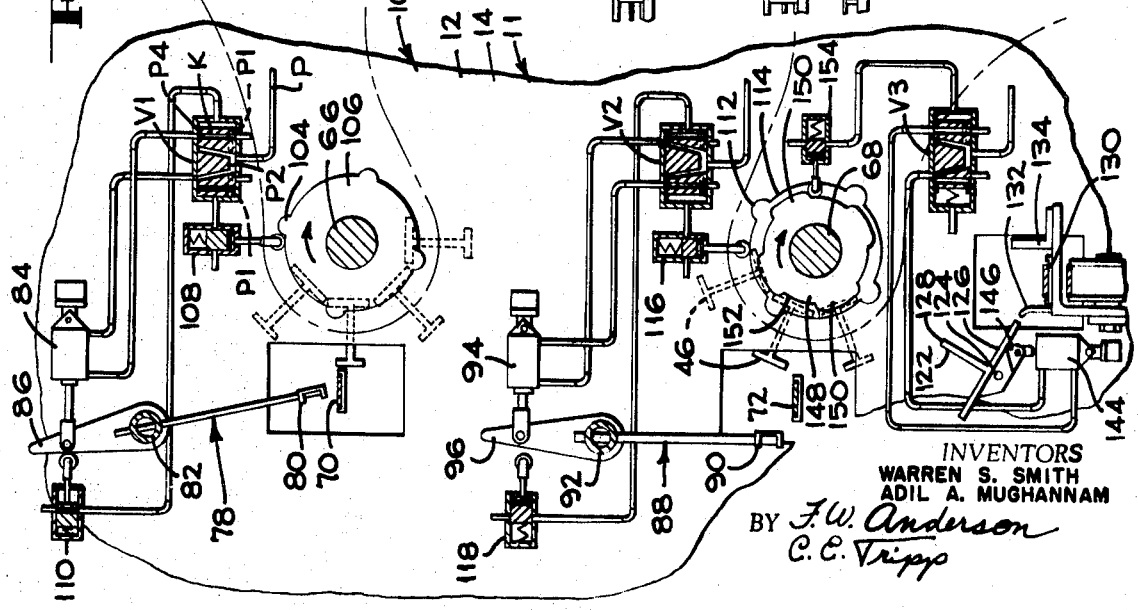

3,568,816

MULTIPLE FEED AND DISCHARGE SYSTEM AND METHOD

BACKGROUND OF THE INVENTION

1. Field of the Invention

This invention pertains to the cooker art and more particularly relates to a multiple feed and discharge system for a hydrostatic cooker.

2. Description of the Prior Art

Because hydrostatic cookers are quite large and expensive, it is desirable to make the cookers as versatile as possible so that the food processers can justify their large investment. One manner of making the cooker more versatile is to increase the speed of the processing conveyor and to adapt the feed and discharge system so that several different products can be processed simultaneously. Such a system is disclosed in U.S. Pat. to Jones et al. 3,072,239 wherein three separate feed conveyors and three separate discharge conveyors are disposed immediately adjacent a single arcuate curve of the processing conveyor each time three empty carriers are moved into position to be filled, and after the rows of containers have been processed the containers are discharged from the carriers three rows at a time. In accordance with the Jones et al. disclosure it is recognized that each of the three rows of containers fed into carriers of the processing conveyor may have a different type or grade of product therein and that subsequent discharge of these rows of containers will be controlled so as to resegregate the containers into groups having common commodities therein. However, because the Jones carriers are of the type which are opened to receive and discharge containers when moving around an arcuate path, and because the radius of curvature of the single arcuate path at the common feed and discharge station of Jones must be of relatively large diameter to accommodate the several feed and discharge conveyors crowded therearound, the Jones et al. carriers cannot open widely enough to accommodate a wide size range of containers unless the carrier webs are made longer than their minimum permissible size.

SUMMARY OF THE INVENTION

The multiple feed and discharge system of the present invention includes a plurality of feed stations with only a single feed conveyor associated with each feed station thereby permitting the feed conveyors to be spaced a considerable distance apart. The processing conveyor is trained around separate pairs of small diameter sprockets at each feed station so that the I-beam carriers of the processing conveyor will open sufficiently to permit the maximum size containers that will fit between adjacent carrier walls to move into the carriers at the feed station. After the rows of containers have been processed, all rows are discharged from the processing conveyor at a single discharge station as the processing conveyor is moving around a pair of small diameter sprockets that are equal in size to the sprockets at the feed stations, and preferably are a pair of the sprockets at one of the feed stations.

A pivotal discharge gate is disposed below the discharge station to receive all of the processed rows of containers and to discharge alternate rows of containers onto one discharge conveyor and the other rows of containers onto a second discharge conveyor.

BRIEF DESCRIPTION OF THE DRAWINGS

FIG. 1 is a diagrammatic vertical section taken through a hydrostatic cooker having the multiple feed and discharge system of the present invention associated therewith, the feed and discharge system being illustrated at a greatly exaggerated scale.

FIG. 2 is an enlarged vertical central section taken through the feed and discharge system of FIG. 1, the view being taken substantially along lines 2–2 of FIG. 4.

FIG. 3 is an enlarged section illustrating two carriers deflected to their maximum extent for receiving or discharging maximum size containers, and further illustrating two carriers as they appear when moving along a linear path.

FIG. 4 is a side elevation of a portion of the feed and discharge system.

FIG. 5 is an enlarged diagrammatic section taken substantially along lines 5–5 of FIG. 4 illustrating a control system for actuating the multiple feed and discharge system of the present invention in timed relation with the movement of the processing conveyor, certain parts being shown out of their true plane of section.

DESCRIPTION OF THE PREFERRED EMBODIMENT

The multiple feed and discharge system 10, (FIGS. 1 and 2) of the present invention, is associated with a hydrostatic cooker 12 of well-known design. The hydrostatic cooker 12 comprises a frame 11 that includes a pair of spaced vertical support walls 14 (only one wall being shown in FIG. 1) that are supported in spaced parallel relationship. A housing 16 which extends between the two walls 14 has a rounded upper end 18 and two depending walls 20 and 22 which cooperate with the two walls 14 to define a cooking chamber 24 which is filled with steam at a predetermined cooking pressure and temperature, for example, at about 250° to 275° F. and 15 to 20 p.s.i. gauge. The lower end of the housing 16 opens into a water filled trough or chamber 26 which is formed by the two walls 14, a transverse horizontal plate 28 and the lower end portions of two transverse vertical walls 30 and 32. The wall 30 cooperates with another transverse wall 34 to define an inlet hydrostatic water leg 36, and the wall 32 cooperates with a transverse vertical wall 38 to provide an outlet hydrostatic leg 40. The hydrostatic legs 36 and 40 cooperate with the chamber 26 and are filled with water so as to create sufficient pressure to resist the pressure of steam in the cooking chamber 24. The inlet hydrostatic water leg 36 is thermostatically controlled to provide a gradually increasing water temperature from approximately 210° F. at its upper end to approximately the sterilizing temperature in the steam chamber at its lower end. The outlet water leg 40 is also thermostatically controlled to provide a gradually decreasing temperature from approximately the sterilizing temperature at its lower end to any suitable temperature below the boiling point of water, for example 85° F., at its upper end. Steam is added to the water in the hydrostatic inlet water leg 36 to provide the desired temperature therein, and cooling water is directed into the outlet or cooling leg 40 to provide the desired cooling temperature therein.

Rows of containers generally designated by the letter C are advanced through the hydrostatic cooker 12 by a processing conveyor 44 having I-beam carriers 46 thereon. The processing conveyor 44 is trained around pairs of sprockets 48 that are rotatably supported by the vertical walls 14, and guide rails 50 (FIG. 2) are secured to the cooker walls 14 so as to guide the conveyor along a circuitous path. The conveyor 44 is driven by a motor 42 which is connected to one or more of the pairs of sprockets 48 by a chain drive 54.

The processing conveyor 44 is also trained around two pair of small diameter sprockets 60 and 62 (FIG. 2) and a pair of large diameter sprockets or wheels 64 of the multiple feed and discharge system 10 of the present invention. The sprockets 60, 62 and 64 are mounted on shafts 66, 68 and 69, respectively, journaled on the frame of the cooker, with the shafts 66 and 68 being spaced a considerable distance apart and the shaft 69 being disposed at one side and between the shafts 66 and 68. The sprockets 60 are of small diameter and serve to fully open the carriers at a first feed station FS1, while the sprockets 62 are also of small diameter and serve to fully open the carriers at a combined second feed station FS2 and discharge station DS. All rows of containers are consecutively discharged from the carriers at the single discharge station DS.

As shown in FIGS. 2 and 4, a first feed conveyor 70 is mounted on a frame 11 immediately adjacent the processing conveyor 44 at the first feed station FS1 and is continuously driven by a motor-transmission unit M1 and a second feed conveyor 72 is disposed immediately adjacent the processing conveyor 44 at the second feed station and is continuously driven by a second motor-transmission unit M2. Containers to be processed are advanced by the feed conveyors 70 and 72 and are formed in sticks or rows of containers that are about 7 feet long at the feed stations by cooperation between container stops (not shown) and container arresting devices 76 which may be of the well-known type disclosed in U.S. Pat. No. 3,067,850 which issued to French et al. on Dec. 11, 1962 and is assigned to the assignee of the present invention.

A first feed mechanism 78 (FIG. 2) is provided at the first feed station and includes a pusher bar 80 secured to a shaft 82 which is journaled on the frame 11. The pusher bar 80 is actuated by pneumatic cylinder 84 that is connected between the frame 11 and an arm 86 keyed to the shaft 82. The pusher is actuated each time every second carrier 46 moves past the feed conveyor 70 at feed station FS1 thereby deflecting rows of containers into alternate carriers of the processing conveyor 44. Similarly, a second feed mechanism 88 is provided at the second feed station FS2 and includes a pusher bar 90 secured to a shaft 92 which is journaled on the frame 11. The pusher bar 90 is actuated by pneumatic cylinder 94 that is connected between the frame 11 and an arm 96 keyed to the shaft 92. The pusher 90 is actuated each time alternate carriers that are not to be filled at the first feed station FS1 are moved past the second feed station FS2.

As illustrated in FIG. 5, the pusher 80 is moved from a retracted to the illustrated position in response to a lobe 104 of a cam 106 keyed to shaft 66 contacting and actuating a pneumatic vent valve 108 which controls the position of the core K of a master valve V1. The pusher 80 is returned to the retracted position in response to the arm 86 a contacting and actuating a second pneumatic vent valve 110.

The master valve V1 is of well-known type which receives high-pressure air from a pressure line P and continuously directs pressure to both ends of the valve through a small passage P1. Thus, the momentary opening of vent valve 110 causes the core K to shift from the left end to the low-pressure right end of the valve. As illustrated in FIG. 5, the valve 110 has just been actuated but the core K has not as yet shifted to the right. Opening vent valve 108 causes the core to shift to the position shown in FIG. 5 causing the cylinder 84 to move the pusher to the illustrated active position. High-pressure air is also continuously directed into a U-shaped passage P2, and is directed from passage P2 into the appropriate end of the pneumatic cylinder 84 by suitable conduits. The opposite end of the pneumatic cylinder 84 is vented to atmosphere through either vent passage P3 or P4 in core K and cooperating ports in the valve housing.

The pusher 90 is similarly moved into the active container deflecting position by the lobes 112 of a cam 114 that is keyed to the shaft 68, which lobes 112 contact and actuate a vent valve 116 which in turn controls the flow passages within a master valve V2 that is identical to valve V1. Upon completion of its container deflecting stroke, the arm 96 actuates pneumatic vent valve 118 thereby reversing the direction of flow of high-pressure air into the cylinder 94 and returning the pusher bar 90 to its retracted or inactive position.

After the rows of containers fed into the carriers 46 (FIG. 2) have been processed, they are advanced to the discharge station DS and are discharged from the carriers 46 one row at a time over the edge 119 of a container supporting discharge guide plate 120. The rows of processed containers gravitate from the guide plate 120 onto a pivotal discharge gate 122. The gate 122 is pivoted on stub shafts 124 journaled in the frame 11 and includes a support plate 126 and a dividing member 128 rigid therewith and projecting upwardly therefrom. The gate 122 is pivoted between the full position thereby receiving alternate rows of containers on opposite sides of the dividing member 128. The rows of containers received on the right side (FIG. 2) of the dividing member 128 gravitate onto a first continuously driven discharge conveyor 130 between guide rails 132 and 134. Similarly, the rows of containers received on the left side of the dividing member 128 gravitate onto a second continuously driven discharge conveyor 136 between guide rails 138 and 140. A curved guide plate 142 is adjustably mounted on the frame 11 to accommodate containers of different sizes and serves to aid in maintaining the containers in each row in alignment as the containers gravitate onto the second discharge conveyor 136.

As shown in FIG. 5, the gate 122 is pivoted between its two positions in timed relation with the movement of the processing conveyor 44 by a pneumatic cylinder 144. The cylinder is pivotally connected between the frame 11 and an arm 146 connected to the shaft 124 and is actuated by a cam 148 secured to conveyor shaft 68. The cam 148 has four equally spaced lobes 150 and four valleys therebetween. The lobes 150 actuate a first pneumatic vent valve 154 which in turn actuates the cylinder 144 through a master valve V3. The master valve V3 is similar to the valve V1 and V2 except that its core is moved to the right (FIG. 5) in response to the combined forces of a spring and the venting of the right end of the valve, and is moved to the left by high-pressure air in the right end of the valve. Actuation of the cylinder 144 causes the dividing member 128 to move from the full line position to the dotted line position as shown in FIG. 2. When the actuating element of the vent valve enters the valleys 152, the cylinder 144 returns the gate to the full line position.

Thus, if containers having one type of product therein are fed into the carriers 46 (FIG. 2) of the processing conveyor at the first feed station FS1, and containers having different products therein are fed into the alternate carriers of the processing conveyor at the second feed station FS2, it will be noted that the discharge gate 122 will be effective to reciprocate these containers so that all containers having one product therein will be received on the first discharge conveyor 130 and the other containers with the other product therein will be received on the first discharge conveyor 130 and the other containers with the other product therein will be discharged onto the second discharge conveyor 136.

An important feature of the invention is that the multiple feed and discharge system of the present invention permits the I-beam carriers 46 (FIG. 3) to be deflected to their fully open positions since the diameter of the sprockets at each feed station services only one feed conveyor, and, accordingly, may be as small in diameter as desired. Because the mouth of the carriers can be opened to their maximum extent at the feed stations and at the discharge station, smaller and lighter carriers can be used to accommodate a larger range of containers sizes. The radius at the feed and discharge station is such that a container that will just clear the carrier mouth formed by adjacent retaining flanges of two adjacent carriers when the carriers are moving around the small radius curves will engage both container retaining flanges of two adjacent carriers when the conveyor is moving along a linear path.

In this regard and in accordance with the preferred embodiment of the invention the pitch of the chains of the processing conveyor is 3¾ inches and each chain links deflect 45° relative to the next adjacent links when moving around the small diameter sprockets at the feed and discharge stations. One carrier 46 is mounted on each link, and each carrier 46 has web 160 which is 3 inches long and has a short flange 162 on one end which is 1½ inches long and a long flange 164 on the other end which is 2⅝ inches long. Each carrier 46 is mounted with the web 160 at the longitudinal midpoint of its supporting links and disposed normal thereto. The inner surface of the short flange 162 is 1⅞ inches from the longitudinal axis of its supporting links.

Although the particular conveyor 44 and carriers 46 as above-described is specifically designed for handling cans having a diameter of 3 3/16 inches to provide a ⅛-inch working clearance, it will be noted that the use of the small diameter sprockets at the feed and discharge station permits the carriers to be opened wide enough to receive and discharge containers C1 a which are 3 5/16 inches in diameter, and that such containers C1 would completely fill the carriers, i.e., the containers would contact the webs and the short and long flanges of adjacent carriers when the carriers were moving along linear paths. Accordingly, by using a plurality of spaced feed stations in the subject multiple feed and discharge system, the carriers may be moved around curves at the feed and discharge stations which are sharp enough to insure that the maximum size containers that the carriers could possibly accommodate can be fed into and be discharged from the carriers. This is accomplished without requiring, for example, that the webs be longer than is absolutely necessary. Thus, when handling rows of containers of maximum diameter for the particular size of carriers being used, the weight of the carriers are reduced to a minimum and more rows of containers can be accommodated per linear foot of the processing conveyor. Since the processing conveyor may have vertical runs on the order of about 60 feet long it will be recognized that a small reduction of weight of each carrier will result in a substantial reduction of total weight acting on the conveyor links at the upper portion of each vertical run.

In addition to being designed to handle containers having a diameter of 3 3/16 inches, the carriers when dimensioned as above indicated are specifically designed to handle containers that are 2 11/16 inches in diameter. It will be understood, however, that containers C2 as small as 2 ¼ inches in diameter will be confined within such carriers while passing through the cooking mediums in the hydrostatic cooker. In this regard, the containers C2 will be positively confined within the carriers when the conveyor is moving along a linear path and while the carriers are immersed in liquids in the cooker, and will be gravitationally held within the carriers when moving along arcuate portions of the conveyor path near the upper end of the cooker. However, when handling containers C2 that are as small as 2 ¼ inches in diameter, arcuate guide plates (not shown) are required at portions 166 and 168 (FIG. 1) of the return run of the conveyor below the cooking chamber. As illustrated in FIG. 2, an arcuate guide plate 170 is positioned below a portion of the processing conveyor 44 to prevent rows of containers of any size fed into alternate carriers 46 at feed station FS2 from gravitating out of the carriers at feed station FS1.

Although only one specific size of carriers and chain pitch has been shown and described for handling containers of a specific size range, it will be understood that other proportional chain pitches and carriers sizes may be employed for other container size ranges.

From the foregoing description, it will be apparent that the multiple feed and discharge system of the present invention utilizes several spaced feed stations and a single discharge station for directing containers into and discharging containers from articulating carriers of a processing conveyor. Because the feed stations are spaced apart, the processing conveyor may be moved around arcuate paths of a very small radius thus making it possible to handle a range of containers which vary greatly in size and also making it possible to accommodate the largest containers of a particular size range with the smallest carrier possible. The multiple feed and discharge system also includes a pivotal gate below the single discharge station for resegregating the rows of containers received from the processing conveyor into groups of containers, with one group of containers being the same as the group of containers fed into the carriers at one feed station and the other group of containers being the same as the containers fed into the carriers at another feed station.

Although the best mode contemplated for carrying out the present invention has been herein shown and described, it will be apparent that modification and variation may be made without departing from what is regarded to be the subject matter of the invention as set forth in the appended claims.

We claim:

1. A multiple feed and discharge system for a cooker including a cooking chamber, an endless processing conveyor movable through said cooking chamber, a plurality of articulating carriers on said conveyor, means defining a plurality of spaced feed stations along said conveyor; each feed station including means for guiding the processing conveyor around a relatively small radius curve for widely opening said carriers, each feed station being spaced from the next adjacent feed station a distance greater than the diameter of said small radius curve, and means at each feed station for deflecting rows of containers into selected ones of the empty carriers; said selected carriers equal to the number of feed stations so that all carriers are filled; a stationary arcuate guide plate disposed below and closely adjacent to the path of movement of the processing conveyor at each feed station except the initial feed station for precluding containers fed into the carriers at the initial feed station from gravitating out of the carriers at other feed stations; and means for discharging the rows of containers from the carriers after passing through the cooking chamber.

2. An apparatus according to claim 1 wherein said carriers each include a web with a narrow retaining flange on one end and a wide retaining flange on the other end, the space between adjacent narrow flanges defining a mouth, said mouth of the carriers opening sufficiently to allow passage of a container therethrough that will just clear the mouth when the conveyor is moving around said small radius and will engage both container retaining flanges of two adjacent carriers when the conveyor is moving along a linear path.

3. Apparatus according to claim 1 wherein said discharge means includes means for guiding the processing conveyor around a relatively small radius curve, means for releasing all rows of containers from their carriers at a common point, and means for controlling the point of discharge of the rows of containers released from the carriers.

4. An apparatus according to claim 1 wherein two feed stations are provided and wherein rows of first containers are deflected into alternate carriers at one feed station and rows of distinguishable second containers are deflected into the remaining carriers at the other feed station.

5. An apparatus according to claim 1 wherein said carriers are of the I-beam type, each carrier including a web with a short flange on one end and a long flange on the other end, the radius of curvature of said curves being effective to separate the short flanges a distance sufficient to prevent passage therebetween of a row of containers having a diameter which contacts the webs and the short and long flanges of adjacent carriers when the carriers are moving along a linear path.

6. An apparatus according to claim 1 wherein the processing conveyor includes a pair of spaced chains defined by a plurality of elongated links pivoted together, and wherein the radius of curvature of the processing conveyor at the feed and discharge stations is such as to cause the a longitudinal axes of adjacent links to deflect 45° from each other.

7. An apparatus according to claim 2, wherein the processing conveyor includes a pair of spaced chains defined by a plurality of elongated links pivoted together, and wherein the radius of curvature of the processing conveyor at the feed and discharge stations is such as to cause the longitudinal axes of adjacent links to deflect 45° from each other.

8. A method of feeding rows of containers into and discharging rows of containers from articulating carriers of a driven processing conveyor comprising the steps of moving the conveyor along a predetermined path including first and second arcuate portions of small diameter spaced apart a distance in excess of the radius of said arcuate portions, the diameter of said arcuate portions being small enough to open the carriers an amount sufficient to pass containers into carriers of a size sufficient to preclude movement of the containers within their supporting carriers either laterally or longitudinally relative to the path of movement of the carriers when the carriers are moving along a linear path, deflecting rows of first containers into spaced ones of said carriers at said first arcuate portion, retaining said rows of first containers in said spaced ones of said carriers from gravitational discharge when the lower portion of said spaced ones of said carriers are opened in response to movement around the lower portion of said second arcuate portion, deflecting rows of second containers into other carriers at said second arcuate portion, and consecutively discharging all of said rows of containers from the carriers at a common point after completing movement of the carries carriers around a major portion of said path.

PO-1050
(5/69)

UNITED STATES PATENT OFFICE
CERTIFICATE OF CORRECTION

Patent No. 3,568,816                    Dated    March 9, 1971

Inventor(s)   WARREN S. SMITH

It is certified that error appears in the above-identified patent and that said Letters Patent are hereby corrected as shown below:

| | | |
|---|---|---|
| Column 3, | line 71 | after "full" insert --line--. |
| Column 3, | line 72 | after "position" and before "thereby insert --shown in Figure 2 to the do line position--. |
| Column 4, | lines 37 and 38 | delete "received on the first discha conveyor 130 and the other containe1 with the other products therein will |
| Column 4, | line 75, | after "Cl" delete "a". |
| Column 5, | line 46, | change "carriers" to --carrier--. |
| Column 6, | line 9, | after "carriers" add the following --being separated from each other by number of carriers--. |
| Column 6, | line 51 | after "the" delete "a". |
| Column 8, | line 2 | after "the" delete "carries". |

Signed and sealed this 7th day of March 1972.

(SEAL)
Attest:

EDWARD M. FLETCHER, JR.                ROBERT GOTTSCHALK
Attesting Officer                      Commissioner of Patents